United States Patent
Parish, Jr.

(10) Patent No.: US 7,469,675 B2
(45) Date of Patent: Dec. 30, 2008

(54) FUEL INJECTION SYSTEM WITH CROSS-FLOW NOZZLE FOR ENHANCED COMPRESSED NATURAL GAS JET SPRAY

(75) Inventor: James R. Parish, Jr., Yorktown, VA (US)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 12/010,486

(22) Filed: Jan. 25, 2008

(65) Prior Publication Data

US 2008/0184964 A1 Aug. 7, 2008

Related U.S. Application Data

(63) Continuation of application No. 11/428,962, filed on Jul. 6, 2006, now abandoned.

(51) Int. Cl.
*F02B 5/00* (2006.01)
*F02B 5/02* (2006.01)

(52) U.S. Cl. .................................. 123/305; 123/470

(58) Field of Classification Search ................ 123/305, 123/470, 456, 298; 239/533.1, 533.12
See application file for complete search history.

(56) References Cited

U.S. PATENT DOCUMENTS

| | | | |
|---|---|---|---|
| 2,995,123 A * | 8/1961 | Goschel ..................... | 123/470 |
| 3,159,151 A | 12/1964 | Woodward | |
| 3,955,548 A * | 5/1976 | Thomas, Jr. ................ | 123/592 |
| 4,014,472 A * | 3/1977 | Bennett ..................... | 239/533.1 |
| 5,058,549 A * | 10/1991 | Hashimoto et al. ........ | 123/298 |
| 5,201,806 A | 4/1993 | Wood | |
| 5,419,297 A | 5/1995 | Peterson et al. | |
| 5,551,400 A * | 9/1996 | Rice et al. ................. | 123/470 |
| 5,617,835 A | 4/1997 | Awarzamani et al. | |
| 5,685,280 A | 11/1997 | Krauss et al. | |
| 5,718,205 A | 2/1998 | Jo | |
| 5,722,375 A * | 3/1998 | Nally et al. ................. | 123/531 |
| 5,775,282 A | 7/1998 | Smith | |
| 6,412,450 B1 | 7/2002 | Jaasma | |
| 6,622,700 B2 | 9/2003 | Lee et al. | |
| 6,837,228 B2 * | 1/2005 | Baasch et al. .............. | 123/585 |
| 6,886,538 B2 | 5/2005 | Lee et al. | |
| 2003/0230285 A1 | 12/2003 | Lee et al. | |

(Continued)

FOREIGN PATENT DOCUMENTS

JP 2001132549 A 5/2001

(Continued)

*Primary Examiner*—Mahmoud Gimie

(57) ABSTRACT

An intake manifold system including an intake manifold and a compressed natural gas (CNG) fuel injector located between an inlet and an outlet of the intake manifold. The CNG fuel injector includes a housing, an inlet, an outlet, a seat, a closure member, and a nozzle. In a preferred embodiment, the inlet and outlet communicate a flow of gaseous fuel regulated by the closure member. The gaseous fuel passes through the seat, which is secured to a rim surface of a retainer portion of the nozzle, and into a flow passage that further communicates the flow of gaseous fuel into one or more flow channels. The orientation of the flow channels within the nozzle greatly affects the discharge pattern and mixing characteristics of the gaseous fuel within an intake manifold. A method of metering gaseous fuel in an intake manifold having a gaseous fuel supply coupled to a fuel injector is also described.

19 Claims, 3 Drawing Sheets

U.S. PATENT DOCUMENTS

| | | | |
|---|---|---|---|
| 2004/0025848 A1 | 2/2004 | Lee et al. | |
| 2006/0207547 A1 | 9/2006 | Saito | |
| 2008/0006713 A1* | 1/2008 | Parish | 239/5 |
| 2008/0011887 A1* | 1/2008 | Parish | 239/585.5 |

FOREIGN PATENT DOCUMENTS

| | | |
|---|---|---|
| JP | 2001214811 A | 8/2001 |
| WO | WO 98/10184 A | 3/1998 |
| WO | WO 99/18345 A | 4/1999 |
| WO | WO 2004/106722 A | 12/2004 |

* cited by examiner

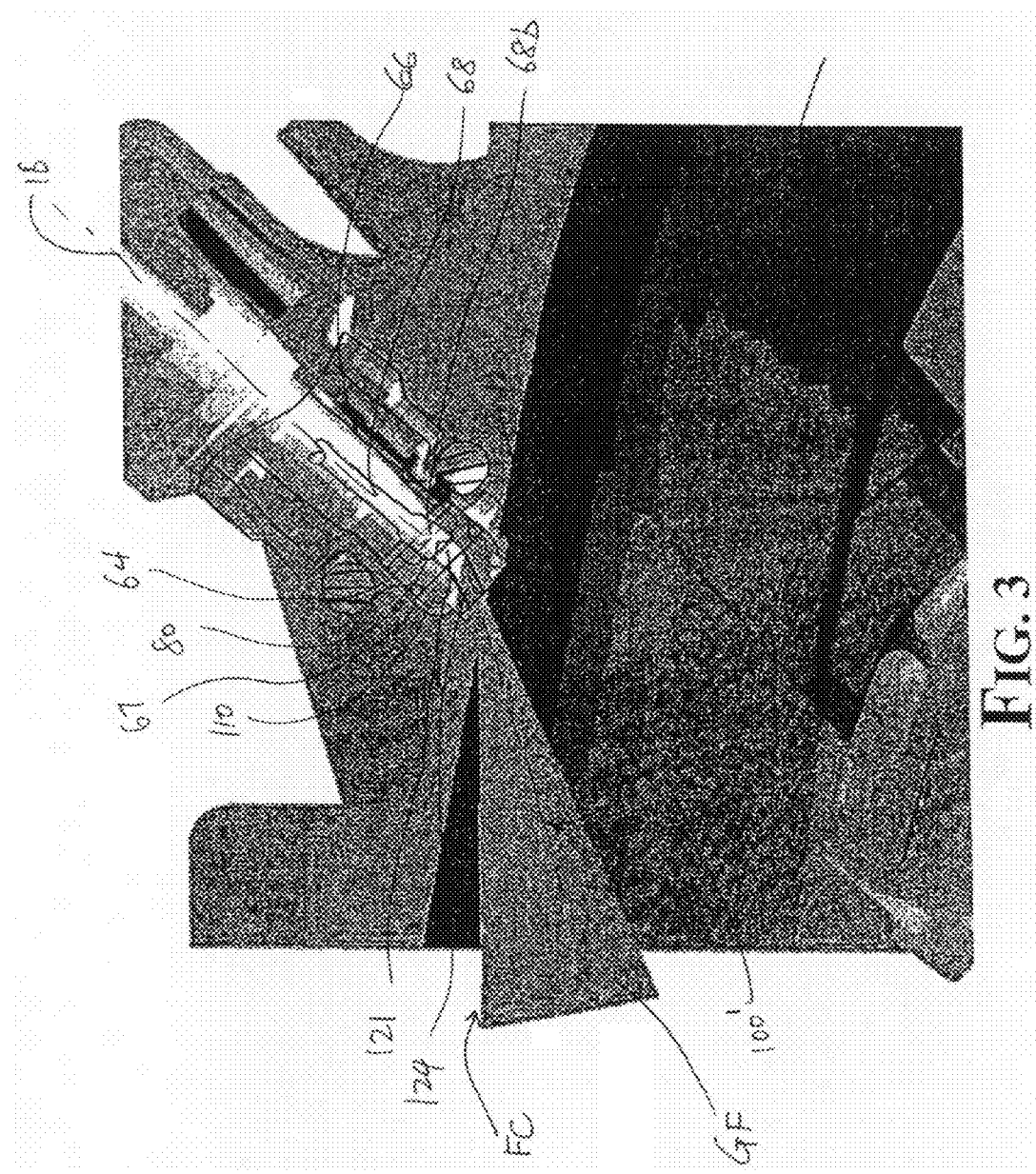

FUEL INJECTION SYSTEM WITH CROSS-FLOW NOZZLE FOR ENHANCED COMPRESSED NATURAL GAS JET SPRAY

This application is a continuation of commonly-assigned, application Ser. No. 11/428,962, filed on Jul. 6, 2006 now abandoned.

BACKGROUND OF INVENTION

In the case of internal combustion engines having injection systems, fuel injectors are conventionally used to provide a precise amount of fuel needed for combustion. Compressed natural gas (hereinafter sometimes referred to as "CNG") is a common automotive fuel for commercial fleet vehicles and residential customers. In vehicles, the CNG is delivered to the engine in precise amounts through fuel injectors, hereinafter referred to as "CNG injectors", or simply "fuel injectors." CNG injectors of this type are described in commonly assigned U.S. Pat. No. 5,494,224, the disclosure of which is incorporated by reference herein. Typically, the CNG injector is required to deliver the precise amount of fuel per injection pulse and maintain this accuracy over the life of the injector. In order to improve the combustion of fuel, certain strategies are required in the design of CNG injectors. These strategies are keyed to the delivery of gaseous fuel into the intake manifold of the internal combustion engine in precise amounts and flow patterns.

It is believed that some conventional CNG injector designs have failed to achieve suitable the combustion of gaseous fuel injected into the intake manifold of an internal combustion engine. Specifically, such design of CNG injectors may reduce air flow or even cause back-flow of the air-fuel mixture into the internal combustion engine's intake plenum or into other engine cylinders thereby causing drivability problems.

SUMMARY OF THE INVENTION

The present invention provides improved gaseous fuel targeting and fuel distribution with an intake manifold system. Back-flow of the air-fuel mixture into the internal combustion engine's intake plenum or into other engine cylinders may be avoided by providing a discharge pattern that forms a cloud of CNG inside the intake manifold. The discharge pattern of CNG delivered to the intake manifold of the present invention is believed to improve the air-fuel mixture and drivability problems that are believed to be in the prior art.

In one aspect of the present invention, an intake manifold system is provided with an intake manifold and a CNG fuel injector. The intake manifold has an inlet and an outlet to permit air flow from the inlet to the outlet along a flow axis connecting the inlet and outlet. The fuel injector is disposed in the intake manifold between the inlet and the outlet of the intake manifold. The fuel injector of the intake manifold system also includes an inlet and an outlet and a passage along a longitudinal axis that communicates a flow of gaseous fuel from the inlet to the outlet. The fuel injector includes a nozzle located proximate to the outlet so that when the fuel injector is operating with pressurized gaseous fuel, at least one column gaseous fuel spray is dispersed orthogonally with respect to a longitudinal axis of the fuel injector. The gaseous fuel spray is directed at an acute angle with respect to the direction of air flow along the flow axis through the intake manifold.

In another aspect of the present invention, a fuel injector system is provided with an intake manifold and a CNG fuel injector. The intake manifold has an inlet and an outlet to permit air flow from the inlet to the outlet along a flow axis connecting the inlet and outlet. The fuel injector is disposed in the intake manifold between the inlet and the outlet. The fuel injector of the intake manifold system also includes an inlet and an outlet and a passage along a longitudinal axis that communicates a flow of gaseous fuel from the inlet to the outlet. The fuel injector includes a nozzle located proximate to the outlet so that when the fuel injector is operating with pressurized gaseous fuel, at least one column gaseous fuel spray is dispersed at an angle with respect to the longitudinal axis and in the direction of the flow axis.

In yet another aspect of the present invention, a method of metering gaseous fuel in an intake manifold having a gaseous fuel supply connected to a fuel injector is provided. The resulting discharge pattern of the gaseous fuel improves the mixing characteristics of the gaseous fuel within the intake manifold. The method can be achieved by: flowing air from an inlet to an outlet through a passage of an intake manifold; flowing gaseous fuel from the gaseous fuel supply to an inlet end of the fuel injector; and forming a generally ellipsoidal gaseous fuel spray pattern proximate the outlet in the passage of the intake manifold.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain features of the invention.

FIG. 3 illustrates a close-up cross-sectional view of the CNG fuel injection system's CNG injector and external nozzle with singular flow channel.

DETAILED DESCRIPTION OF THE PREFERRED EMBODIMENT

Figure 1:
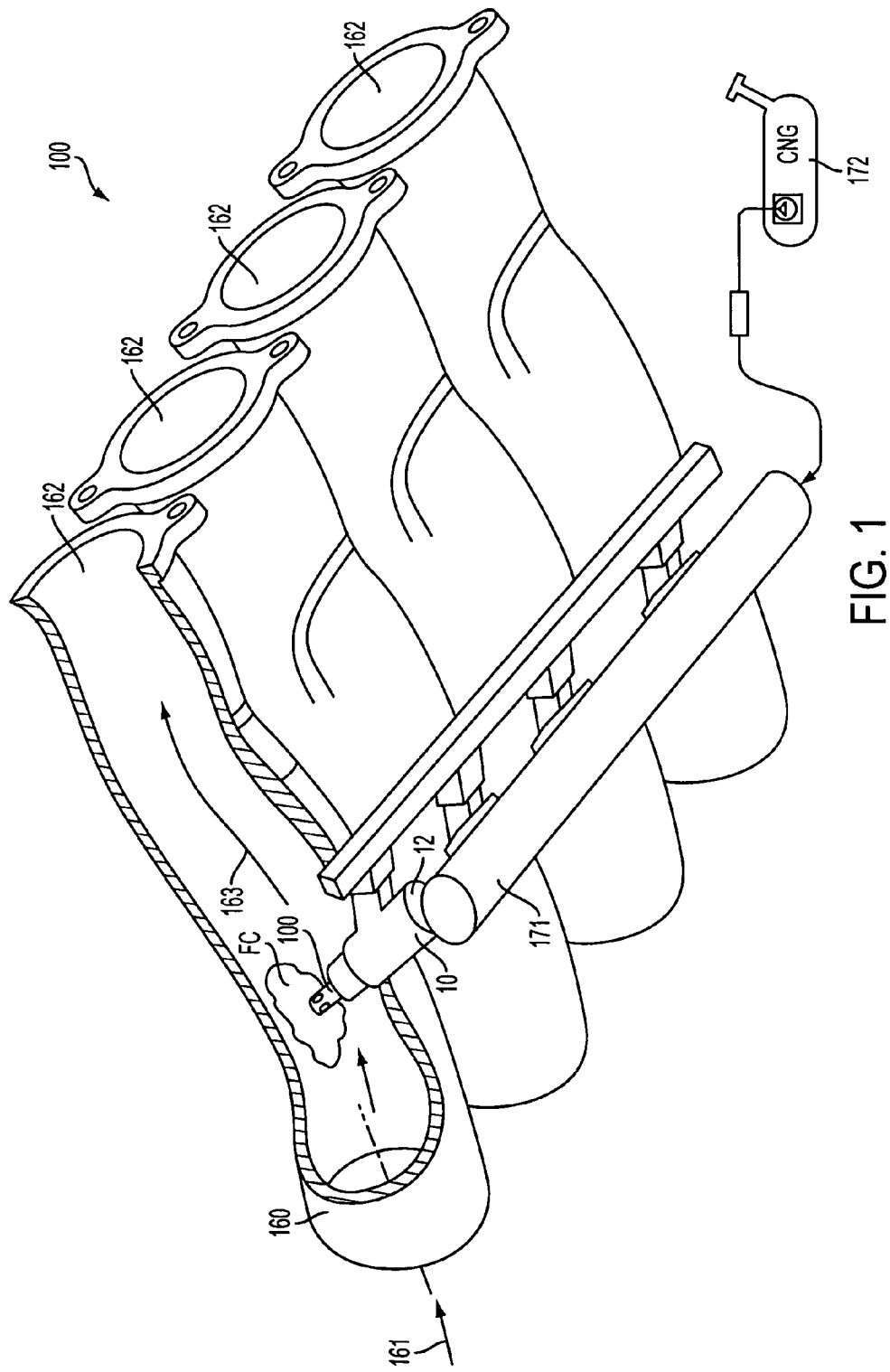
FIG. 1 illustrates a perspective view of the preferred embodiment of the CNG fuel injection system.
Figure 2:
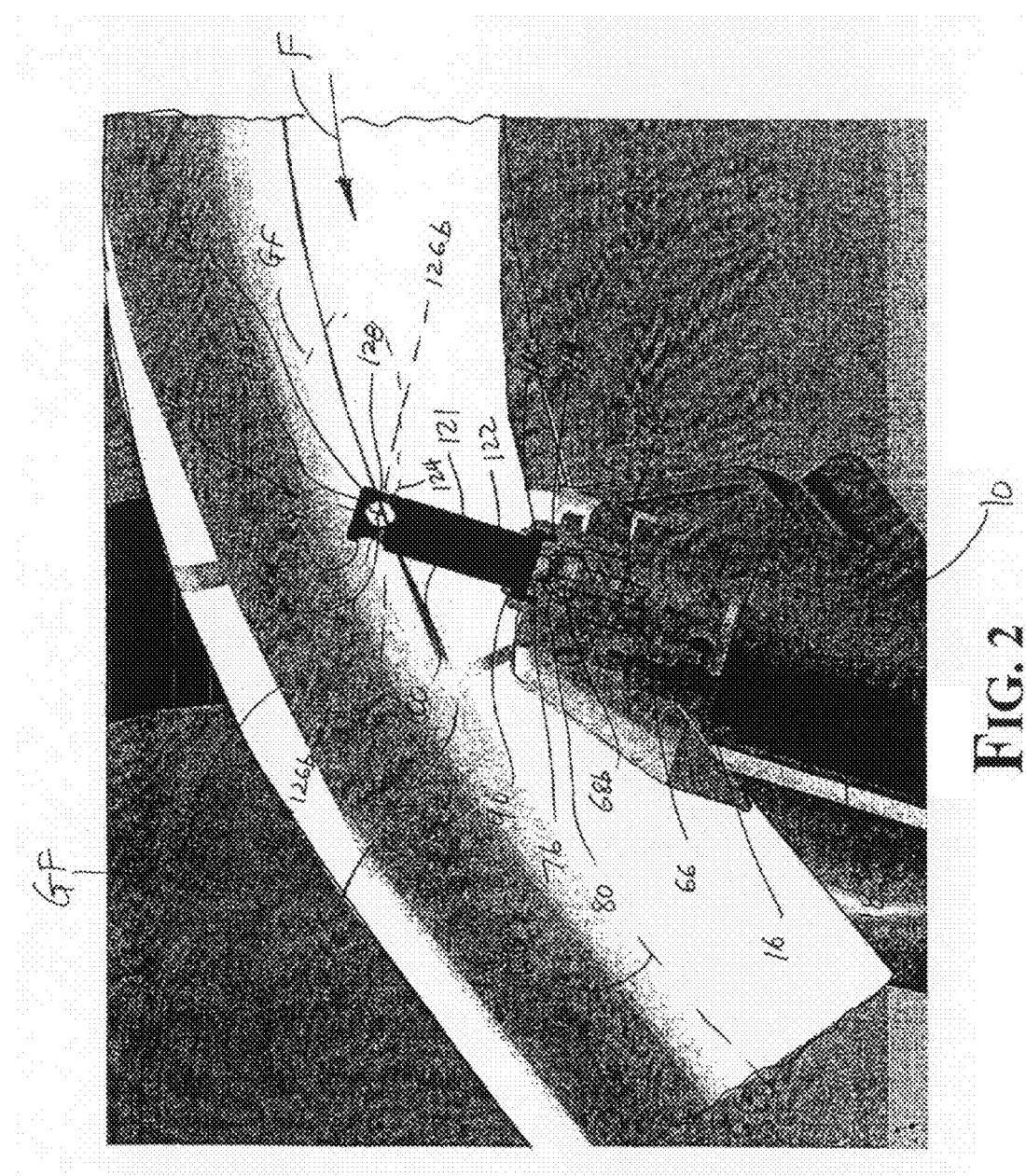
FIG. 2 illustrates a close-up cross-sectional view of the CNG fuel injection system's CNG injector and integral nozzle with four flow channels.

FIGS. 1-3 illustrate the preferred embodiments. In particular, FIG. 1 illustrates an intake manifold system 180 comprising an intake manifold 160 and a CNG fuel injector 10. A fuel rail 171 and a CNG fuel supply 172 are shown, but are not considered part of the intake manifold system 180.

The intake manifold 160 directs an air flow from an inlet 161 to an outlet 162. Outlets 162 are substantially tubular in shape and generally bolt to an engine block, not shown. The intake manifold provides combustion air to the combustion chamber(s) of the engine. The intake manifold 160 may be made of a metallic material, plastic, or other composite material. The intake manifold is preferably made of plastic, most preferably nylon 6-6.

The CNG fuel injector 10 has a housing, which includes a fuel inlet 12, a fuel outlet 14, and a fuel passageway 16 extending from the inlet 12 to the outlet 14 along a longitudinal axis 18. The fuel outlet 14 of the CNG fuel injector 10 is located partially within the intake manifold between its inlet 161 and the outlet 162. The CNG fuel injector 10 provides a metered amount of gaseous fuel that flows through the passageway 16, exits the fuel outlet 14, and discharges inside of the intake manifold 160 for delivery to engine's combustion chambers. The outlet 14 of the CNG fuel injector may be positioned and angled within the intake manifold to optimize engine performance. Features of the CNG fuel injector and its operative performance are disclosed in commonly assigned, commonly filed application Ser. No. 11/428,946, filed on Jul. 6, 2006, entitled "Fuel Injector Having an Internally Mounted Cross-Flow Nozzle For Enhanced Compressed Natural Gas Jet Spray," and application Ser. No. 11/427,911, filed on Jun. 30, 2006, entitled "Fuel Injector Having an External Cross-Flow Nozzle For Enhanced Compressed Natural Gas Jet Spray," which copending applications are incorporated herein by reference in their entireties into this application.

As shown in FIG. 2, a closure member 68 of the CNG fuel injector 10 is centrally located within and spaced from a neck portion 66. The closure member 68 is axially aligned with the longitudinal axis 18 of the gaseous fuel injector 10 and includes a contact portion 68b. The contact portion 68b is imperforate to prevent the flow of air or liquid past the contact portion 68b or a seat orifice 76 when the contact portion 68b is contiguous to a sealing surface 80. Although the closure member 68 is shown as a solid member, the closure member can be provided with an internal bore to reduce its mass or provide for an alternate flow path for fuel as long as the contact portion 68b is imperforate.

FIG. 2 also shows an internally mounted nozzle 100 located proximate to the outlet of the gaseous fuel injector 10, includes a retainer portion 110 and a flow modifier portion 120. The internally mounted nozzle 100 may be made from a suitable material for gaseous fuel. Preferably, the internally mounted nozzle may be made from a plastic material, most preferably nylon 6-6.

The retainer portion 110 of the internally mounted nozzle engages numerous surfaces of a locking portion 90. A first retainer surface 111 of the retainer portion 110 is substantially perpendicular to the longitudinal axis 18 and forms a planar surface to engage a bottom surface of a seat 64 as shown in FIG. 2.

The flow modifier portion 120 affects the flow distribution pattern of gaseous fuel through the internally mounted nozzle 100. The flow modifier portion 120 defines a flow passage 121 that is in fluid communication with the seat orifice 76 and extends along a first flow modifier surface 122 disposed about the longitudinal axis 18. The flow passage 121 extends to a first flow channel 124 located within the internally mounted nozzle 100 as shown in FIG. 3.

The first flow channel 124 is encompassed by a second modifier surface 125 and extends along a first axis 126a. Preferably, the first axis 126a is generally orthogonal to the longitudinal axis 18 as shown in FIG. 3. The first flow channel 124 directs gaseous fuel to discharge the internally mounted nozzle 100. Preferably, the first flow channel 124 is generally circular in cross-section and has fuel flowing out of the flow channel is in the form of a cone.

In one preferred embodiment, a second flow channel (not shown) may extend along the first axis 126a, but in a direction diametrically opposed to the first channel 124. In another preferred embodiment of the present invention, a third flow channel 128 and a fourth flow channel 129 may be extended along a second axis 126b that is generally orthogonal to the longitudinal axis 18 of the internally mounted nozzle 100 as shown in FIG. 3. The third and fourth flow channels can be diametrically opposed to each other and may be generally circular in cross-section as shown in FIG. 3.

Gaseous fuel flows through the seat orifice 76, along the flow passage 121, and may be dispersed through one, two, three, four, or other multiple flow channel configurations of the internally mounted nozzle 100. Thus, the resulting multiple columns of gaseous fuel are dispersed perpendicular to the longitudinal axis 18 of the gaseous fuel injector 10 to improve the mixing characteristics within the intake manifold (not shown). The preferred pressure at which the gaseous fuel injector 10 operates is approximately 200 pounds per square inch gauge pressure and a pressure drop of no more than five pounds per square inch gauge is expected across the nozzle.

As shown in FIG. 3, the CNG fuel injector 10 has a housing, which includes a fuel inlet 12 (not shown), a fuel outlet 14, and a fuel passageway 16 extending from the inlet 12 to the outlet 14 along a longitudinal axis 18. The fuel outlet 14 of the CNG fuel injector 10 is located partially within the intake manifold between the inlet 161 and the outlet 162. See also FIG. 1. The CNG fuel injector 10 provides a metered amount of gaseous fuel that flows through the passageway 16, exits the fuel outlet 14, and discharges inside of the intake manifold 160 for delivery to engine's combustion chambers. The outlet 14 of the CNG fuel injector may be positioned and angled within the intake manifold to optimize engine performance.

As shown in FIG. 3, the CNG fuel injector 10 has the closure member 68 centrally located within the housing and spaced from the neck portion 66. The closure member 68 is axially aligned with the longitudinal axis 18 of the gaseous fuel injector 10 and includes the contact portion 68b. The contact portion 68b is imperforate to prevent the flow of air or liquid past the contact portion 68b or the seat orifice 76 when the contact portion 68b is contiguous to the sealing surface 80. Although the closure member 68 is shown as a solid member, the closure member can be provided with an internal bore to reduce its mass or provide for an alternate flow path for fuel as long as the contact portion 68b is imperforate.

As shown in FIG. 3, an external nozzle 100' is located proximate to the seat 64 of the gaseous fuel injector 10. The external nozzle also includes the retainer portion 110 and the flow modifier portion 120. The external nozzle may be made from a suitable material for gaseous fuel. Preferably, the external nozzle 100' may be made from a plastic material, most preferably nylon 6-6.

The retainer portion 110 of the external nozzle engages an outer surface 67 of the outlet 14 about the longitudinal axis 18 of the gaseous fuel injector 10. The retainer portion 110 couples with the outer surface 67 through e.g., a press-fit, snap-fit, welded, or screw-on connection. A rim surface 111 engages a bottom surface of the seat 64, as shown in FIG. 3.

The flow modifier portion 120 affects the flow distribution pattern of gaseous fuel through the internally mounted nozzle 100'. The flow modifier portion 120 defines a flow passage 121 that is in fluid communication with the seat orifice 76 and extends along a first flow modifier surface 122 disposed about the longitudinal axis 18. The flow passage 121 extends to a first flow channel 124 located within the internally mounted nozzle 100' as shown in FIG. 3.

As shown in FIG. 3, a second flow modifier surface 125 of nozzle 100' may be disposed about an oblique axis 141 to the longitudinal axis 18 and gaseous flow is discharged through a singular flow channel 124, as shown in FIG. 3. A single conical column of gaseous fuel is delivered to the intake manifold 160 at an oblique angle with respect to the longitudinal axis 18 so that in conjunction with an intake manifold geometry, the fuel injector is able to improve its mixing characteristics with air flow in the manifold. The oblique angle $\theta_2$ is preferably between 0.degree. and 90.degree., and most preferably at 26.degree. Preferably, the first flow channel 124 is generally circular in cross-section and has fuel flowing out of the flow channel is in the form of a cone.

It is believed that at least the preferred embodiments described above in relation to the nozzle 100' alleviate backflow of the air-fuel mixture into the internal combustion engine's intake plenum or into other engine cylinders in that the preferred embodiments provide a cloud of gaseous fuel, which can be entrained by the airflow towards the intake for dispersal into the combustion chamber. The discharge pattern of gaseous fuel delivered to the intake manifold of the present invention is believed to improve the air-fuel mixture and drivability problems in certain applications.

In yet another aspect of the present invention, a method of metering gaseous fuel in an intake manifold 160 with a gaseous fuel supply 172 coupled to a CNG fuel injector 10 is provided. The method can be achieved by flowing air from an inlet 161 to an outlet 162 along a flow axis 163 of an intake manifold 160. Concurrently, gaseous fuel flows from the gaseous fuel supply 172 to a fuel inlet 12 of the CNG fuel injector 10. The gaseous fuel flows through the passage 16 and exits a fuel outlet 14 where it is discharged within the intake manifold 160.

The CNG fuel injector 10 has a closure member 68 that interfaces with a seat 64 to regulate the amount of gaseous fuel discharge. A contact portion 68b of the closure member is imperforate to prevent the flow of air or liquid past the contact portion 68b or a seat orifice 76 when the contact portion 68b is contiguous to a sealing surface 80. The closure member 68 is disposed in at least two positions along the longitudinal axis 18 in the passage 16. The seat 64 is disposed in the passage 16 proximate the outlet 14 having a seat orifice 76 extending through the seat 64.

A nozzle e.g., nozzle 100, is proximate the outlet 14 and may have a flow passage 121 and flow channels that intersect each other orthogonally with respect to the longitudinal axis 18. The nozzle 100 may disperse the gaseous fuel into four columns of gaseous fuel spray. The discharged gaseous fuel forms a generally ellipsoidal gaseous fuel spray pattern proximate the outlet 14 in the flow axis 163 of the intake manifold. The resulting discharge pattern of the gaseous fuel improves the mixing characteristics of the gaseous fuel within the intake manifold 160.

While the present invention has been disclosed with reference to certain preferred embodiments, numerous modifications, alterations, and changes to the described embodiments are possible without departing from the sphere and scope of the present invention, as defined in the appended claims. For example, the orthogonal multiple flow channel nozzle also can be an external nozzle, and the oblique single flow channel nozzle also can be an internal nozzle. Accordingly, it is intended that the present invention not be limited to the described embodiments, but that it have the full scope defined by the language of the following claims, and equivalents thereof.

What is claimed is:

1. An intake manifold system comprising:
an intake manifold having an inlet and an outlet to permit air flow from the inlet to the outlet along a flow axis connecting the inlet and outlet; and
a compressed natural gas fuel injector having an inlet and an outlet and a passage extending along a longitudinal axis from the inlet to the outlet, the fuel injector including a nozzle proximate the outlet and disposed in the intake manifold between the inlet and outlet so that when the fuel injector is actuated with pressurized gaseous fuel, at least a pair of diametrically opposed columns of gaseous fuel spray is dispersed orthogonally with respect to a longitudinal axis of the fuel injector and directed at an angle with respect to the direction of air flow along the flow axis through the intake manifold.

2. An intake manifold system comprising:
an intake manifold having an inlet and an outlet to permit air flow from the inlet to the outlet along a flow axis connecting the inlet and outlet; and
a compressed natural gas fuel injector having an inlet and an outlet and a passage extending along a longitudinal axis from the inlet to the outlet, the fuel injector including a nozzle proximate the outlet and disposed in the intake manifold between the inlet and outlet so that when the fuel injector is actuated with pressurized gaseous fuel, at least one column of gaseous fuel spray is dispersed orthogonally with respect to a longitudinal axis of the fuel injector and directed at an acute angle with respect to the direction of air flow along the flow axis through the intake manifold,
wherein the nozzle comprises a retainer portion and flow modifier portion, the retainer portion being secured to an outer surface of the outlet, the flow modifier including a first flow modifier surface and a second flow modifier surface, the first flow modifier surface being disposed about the longitudinal axis to define a flow passage in fluid communication with the seat orifice, the second flow modifier surface being disposed along and about a first axis at an angle with respect to the longitudinal axis to define at least a flow channel.

3. The system of claim 2, wherein the fuel injector comprises:
a closure member disposed in at least two positions along the longitudinal axis in the passage, the closure member having an imperforate contact portion proximate the outlet; and
a seat disposed in the passage proximate the outlet, the seat including a sealing surface contiguous to the imperforate contact portion of the closure member in one position of the closure member to occlude flow through a seat orifice extending through the seat from the sealing surface along the longitudinal axis.

4. The system of claim 3, wherein the second flow modifier surface further comprises a second flow channel diametric to the first flow channel.

5. The system of claim 4, wherein the second flow modifier surface further comprises third and fourth flow channel diametric aligned along a second axis generally orthogonal to the longitudinal and first axes, and each of the flow channels comprises a generally circular cross-section with respect to the first and second axes.

6. The system of claim 3, wherein the at least one column comprises four columns disposed generally orthogonal with respect to the longitudinal axis.

7. The system of claim 3, wherein the retainer portion comprises a portion surrounding an outer surface proximate the outlet of the fuel injector.

8. The system of claim 3, wherein the outlet comprises an inner surface that surrounds a portion of the retainer portion.

9. The system of claim 6, wherein the pressurized gaseous fuel comprises compressed-natural-gas at about 200 psi.

10. An intake manifold system comprising:
an intake manifold having an inlet and an outlet to permit air flow from the inlet to the outlet along a flow axis connecting the inlet and outlet; and
a compressed natural gas fuel injector having an inlet and an outlet and a passage extending along a longitudinal axis from the inlet to the outlet, the fuel injector including a nozzle proximate the outlet and disposed in the intake manifold between the inlet and outlet, the nozzle having a flow passage disposed about an axis that is at an acute angle with respect to the longitudinal axis, so that when the fuel injector is actuated with pressurized gaseous fuel, at least one column of gaseous fuel spray is dispersed generally at an acute angle with respect to the longitudinal axis and in the direction of the flow axis.

11. The system of claim 10, wherein the acute angle comprises about 26 degrees.

12. The system of claim 11, wherein the column comprises a generally conical column extending along a spray axis disposed at the acute angle with respect to the longitudinal axis.

13. The system of claim 10, wherein the pressurized gaseous fuel comprises compressed-natural-gas at about 200 psi.

14. The system of claim 10, wherein the fuel injector comprises:
   a closure member disposed in at least two positions along the longitudinal axis in the passage, the closure member having an imperforate contact portion proximate the outlet; and
   a seat disposed in the passage proximate the outlet, the seat including a sealing surface contiguous to the imperforate contact portion of the closure member in one position of the closure member to occlude flow through a seat orifice extending through the seat from the sealing surface along the longitudinal axis.

15. The system of claim 14, wherein the retainer portion comprises a portion surrounding an outer surface proximate the outlet of the fuel injector.

16. The system of claim 14, wherein the outlet comprises an inner surface that surrounds a portion of the retainer portion.

17. A method of metering gaseous fuel in an intake manifold having a gaseous fuel supply coupled to a compressed natural gas fuel injector, the method comprising:
   flowing air from an inlet to an outlet through a passage of an intake manifold;
   flowing gaseous fuel from the gaseous fuel supply to an inlet end of the compressed natural gas fuel injector; and
   forming a generally ellipsoidal gaseous fuel spray pattern proximate the outlet in the passage of the intake manifold,
   wherein the forming comprises dispersing the gaseous fuel from the inlet through a nozzle proximate the outlet into four columns of gaseous fuel spray, the nozzle having a flow passage in communication with two flow channels intersecting each other orthogonally with respect to a longitudinal axis of the fuel injector.

18. The method of claim 17, wherein the dispersing comprises entraining the four columns of gaseous fuel spray with air flowing through the passage of the intake manifold into the ellipsoidal gaseous fuel spray pattern.

19. The method of claim 17, wherein the step of flowing gaseous fuel includes providing the gaseous fuel as compressed-natural-gas at about 200 psi.

* * * * *